(12) United States Patent (10) Patent No.: US 9,276,937 B2
Cukor et al. (45) Date of Patent: Mar. 1, 2016

(54) DETERMINING ELIGIBILITY TO ACCESS DOWNLOADABLE CONTENT ASSOCIATED WITH PHYSICAL MEDIA

(71) Applicant: Verizon Patent and Licensing Inc., Basking Ridge, NJ (US)

(72) Inventors: Christopher E. Cukor, Menlo Park, CA (US); Stephanie Leung, Sunnyvale, CA (US); Mike C. Murphy, Palos Verdes Estates, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 321 days.

(21) Appl. No.: 13/931,253

(22) Filed: Jun. 28, 2013

(65) Prior Publication Data

US 2015/0006725 A1 Jan. 1, 2015

(51) Int. Cl.
*G06F 13/00* (2006.01)
*H04L 29/06* (2006.01)
*G06F 21/10* (2013.01)

(52) U.S. Cl.
CPC .............. *H04L 63/10* (2013.01); *G06F 21/10* (2013.01); *H04L 2463/101* (2013.01); *H04L 2463/103* (2013.01)

(58) Field of Classification Search
CPC .............. H04L 29/06; H04L 29/08072; H04L 29/0809; H04L 29/08144; H04L 63/08; H04L 63/10; H04L 2463/12; H04L 2463/103; G06F 21/10
USPC ............................ 709/225; 715/716; 725/105
See application file for complete search history.

(56) References Cited

U.S. PATENT DOCUMENTS

2009/0328117 A1* 12/2009 Morris et al. .................. 725/105
2011/0167345 A1*  7/2011 Jones et al. .................... 715/716

* cited by examiner

*Primary Examiner* — Robert B Harrell

(57) ABSTRACT

In embodiments, apparatuses, methods and storage media are described that are associated with provisioning of downloadable content. In various embodiments, an image may be taken of physical media under control of a content consumer, such as a videodisc or CD (or of packaging associated with such physical media). A piece of downloadable content may be identified that is associated with the physical media. After determination of whether provisioning of the downloadable content is authorized, the downloadable content may then be provisioned to the content consumer. In various embodiments, streaming content may be similarly provisioned. Other embodiments may be described and claimed.

25 Claims, 7 Drawing Sheets

DETERMINING ELIGIBILITY TO ACCESS DOWNLOADABLE CONTENT ASSOCIATED WITH PHYSICAL MEDIA

TECHNICAL FIELD

The present disclosure relates to the field of data processing, in particular, to apparatuses, methods and systems associated with provisioning of downloadable content.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of content, and the manners in which the content is acquired. For example, much content is still purchased in the form of physical media, such as videodiscs (e.g., DVDs and/or Blu-ray™ discs) or audio discs, such as CDs. However, media is also often made available to content consumers in pure digital form without the use of physical media, such as by allowing content consumers to download and/or stream digital media. However, the availability of content in one form sometimes does not facilitate a content consumer's ability to acquire the content in another form. For example, content consumers who have access to physical media for a particular piece of content may wish to have the content in purely digital form. However, due to encryption and/or lack of resource availability, this may be difficult for the content consumer to obtain without a separate purchase. This may hinder the ability of content creators to provide content to consumers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Embodiments described herein are directed to, for example, methods, computer-readable media, and apparatuses associated with provisioning of downloadable content based on physical media. In various embodiments, an image may be taken of physical media under control of a content consumer, such as a videodisc or CD (or of packaging associated with such physical media). A piece of downloadable content may be identified that is associated with the physical media. After determination of whether provisioning of the downloadable content is authorized, the downloadable content may then be provisioned to the content consumer. In various embodiments, streaming content may be similarly provisioned. Other embodiments may be described herein.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
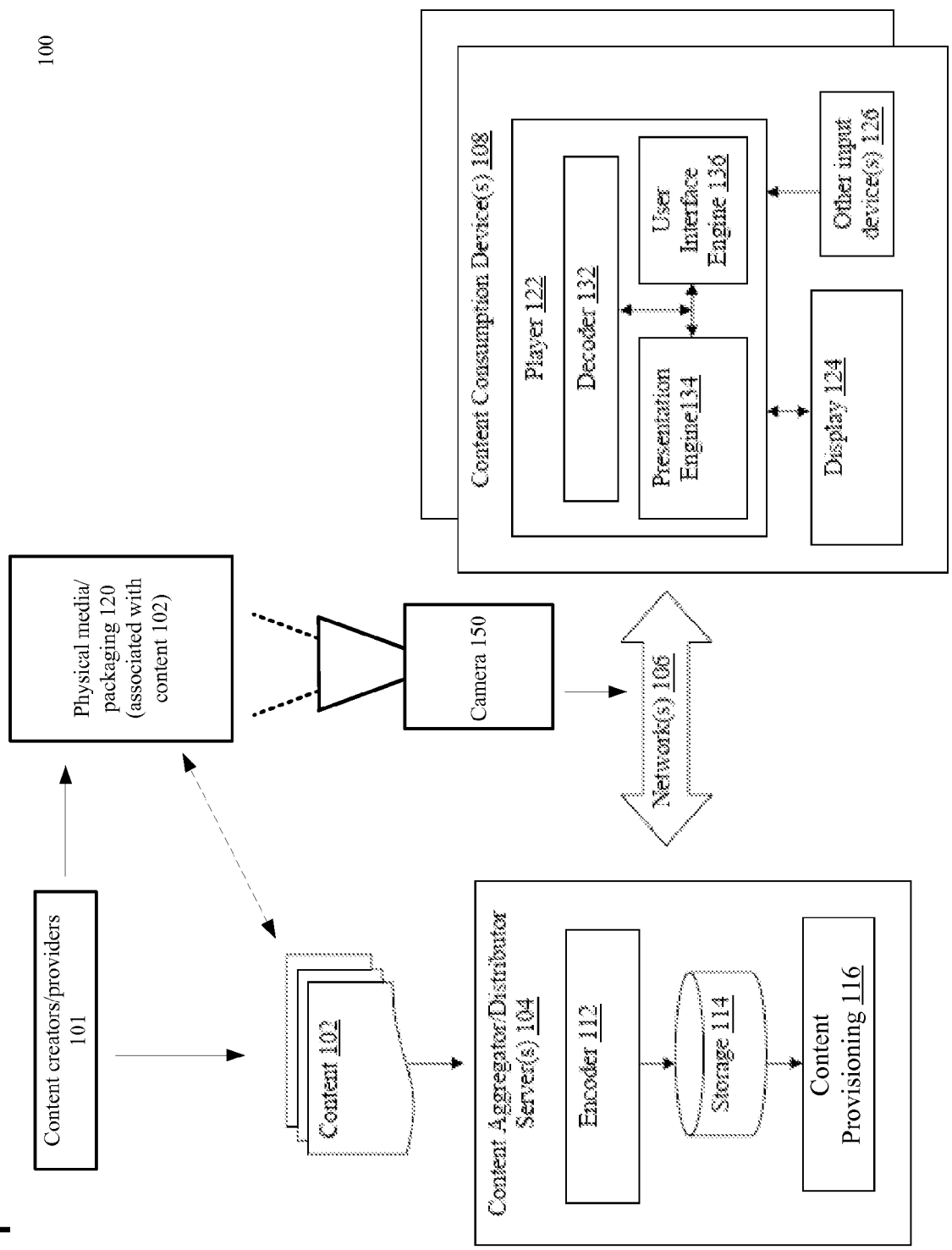
FIG. 1 illustrates an example arrangement for content distribution and consumption, in accordance with various embodiments.

Referring now to FIG. 1, an arrangement for content distribution and consumption, in accordance with various embodiments, is illustrated. As shown, in embodiments, arrangement 100 for distribution and consumption of content may include a number of content consumption devices 108 coupled with one or more content aggregator/distributor servers 104 via one or more networks 106. Content aggregator/distributor servers 104 may be configured to aggregate and distribute content to content consumption devices 108 for consumption, e.g., via one or more networks 106.

In embodiments, as shown, content aggregator/distributor servers 104 may include encoder 112, storage 114 and content provisioning 116, which may be coupled to each other as shown. Encoder 112 may be configured to encode content 102 from various content creators and/or providers 101, and storage 114 may be configured to store encoded content. Content provisioning 116 may be configured to selectively retrieve and provide encoded content to the various content consumption devices 108 in response to requests from the various content consumption devices 108. Content 102 may be media content of various types, having video, audio, and/or closed captions, from a variety of content creators and/or providers 101. Examples of content may include, but are not limited to, movies, TV programming, user created content (such as YouTube video, iReporter video), music albums/titles/pieces, and so forth. Examples of content creators and/or providers 101 may include, but are not limited to, movie studios/distributors, television programmers, television broadcasters, satellite programming broadcasters, cable operators, online users, and so forth.

In various embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality levels. The different versions may provide different resolutions, different bitrates, and/or different frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

In various embodiments, content provisioning 116 may be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth. In various embodiments, content provisioning 116 may be configured to provide media files that are packaged according to one or more output packaging formats. In various embodiments, the content aggregator/distributor server(s) 104 may further include a video frame alignment system 118 ("VFA 118"), which may be coupled to various components of the content aggregator/distributor server(s) 104, including, for example, encoder 112 and/or content provisioning 116. In various embodiments, the VFA 118 may be configured to receive pieces of video content and to output an alignment of video frames so as to provide for comparisons of video content during encoding and/or provisioning. The usage and potential benefit from having the alignment information will be further described below. Particular embodiments of the VFA 118 may be described below.

Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor server 104 communicate with content consumption devices 108. Similarly, at the content consumption end, networks 106 may include base stations and/or access points, through which consumption devices 108 communicate with content aggregator/distributor server 104. In between the two ends may be any number of network routers, switches and other networking equipment of the like. However, for ease of understanding, these gateways, firewalls, routers, switches, base stations, access points and the like are not shown.

In various embodiments, the content creators/providers 101 may also provide physical media 120. In various embodiments, the physical media may include various forms of media that encode content in digital and/or analog forms, including, but not limited to DVDs, Blu-rays™, CDs, analog audio recordings, books, etc. In various embodiments, the content creator/providers 101 may provide content in both a digitally-transmissible form that may be downloaded over a network (e.g., the content 102 that may be encoded by encoder 112 and provisioned by content provisioning 116) as well as in physical media form. In various embodiments, and for the sake of clarity herein, content that is provided via the content provisioning 116 via network(s) 106 may be referred to as "downloadable content," while content that is encoded in physical form may be referred to as being encoded on "physical media." In various embodiments, the physical media 120 may be associated with particular content 102 and thus with one or more pieces of downloadable content that may be downloaded for consumption by a content consumer. In various embodiments, "downloadable content" may be understood to include both content files that are downloaded over a network, in whole or in part, prior to consumption. In various embodiments, "downloadable content" may include streaming content that is received over a network during consumption. Thus "downloadable" may not necessarily be understood to imply any particular limitations or requirements on the form or delivery of digital content.

In various embodiments, as shown, a content consumption device 108 may include player 122, display 124 and user input device 126. Player 122 may be configured to receive streamed content, decode and recover the content from the content stream, and present the recovered content on display 124, in response to user selections/inputs from user input device 126.

In various embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. In various embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive signals from user input device 126 that are indicative of the user selections/inputs from a user, and to selectively render a contextual information interface as described herein.

While shown as part of a content consumption device 108, display 124 and/or user input device(s) 126 may be stand-alone devices or integrated, for different embodiments of content consumption devices 108. For example, for a television arrangement, display 124 may be a stand alone television set, Liquid Crystal Display (LCD), Plasma and the like, while player 122 may be part of a separate set-top box, and user input device 126 may be a separate remote control (such as described below), gaming controller, keyboard, or another similar device. Similarly, for a desktop computer arrangement, player 122, display 124 and user input device(s) 126 may all be separate stand alone units. On the other hand, for a tablet arrangement, display 124 may be a touch sensitive display screen that includes user input device(s) 126, and player 122 may be a computing platform with a soft keyboard that also includes one of the user input device(s) 126. Further, display 124 and player 122 may be integrated within a single form factor. Similarly, for a smartphone arrangement, player 122, display 124 and user input device(s) 126 may be likewise integrated.

In various embodiments, in addition to other input devices, a camera 150 may be configured to capture an image of physical media 120 and/or packaging associated with the physical media 120 that is under control of a content consumer (not pictured). In various embodiments, this camera may include various devices, including separate cameras, webcams, video and/or still cameras, etc. In various embodiments, the camera 150 may be coupled or otherwise associated with various computing devices, including the content consumption device 108, set-top boxes, mobile phones, tablet computers, other mobile devices, laptops, etc. The content provisioning 116 and/or modules of the content provisioning 116 may be configured to receive the captured image and to identify downloadable content associated with the physical media. The content provisioning 116 may then be configured to facilitate provisioning of the identified downloadable content, such as to the content consumption device 108, a mobile device, a laptop, a desktop, etc., for consumption by the content consumer. In other embodiments, the identification and/or facilitation of provisioning may be performed by the content consumption device 108, and/or by another entity.

Figure 2:
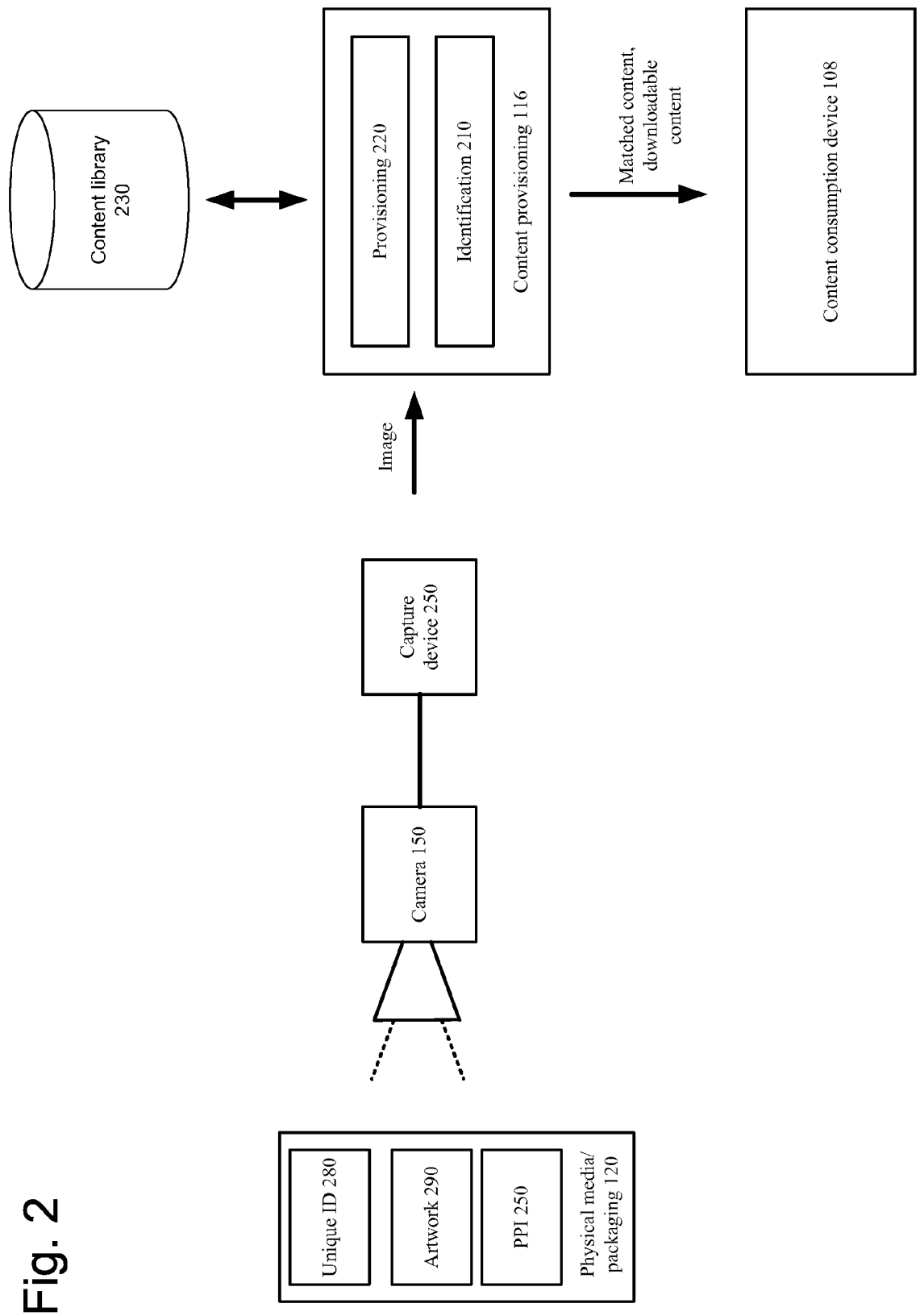
FIG. 2 illustrates an example arrangement for provisioning of downloadable content, in accordance with various embodiments.

Referring now to FIG. 2, an example arrangement for downloadable content provisioning is shown in accordance with various embodiments. As discussed above, in various embodiments, the camera 150 may be configured to capture an image of the physical media 120. In some embodiments the camera 150 may capture an image of packaging associated with the physical media 120, rather than an image of the physical media itself. In various embodiments, while reference will be made herein to physical media 120, it may be recognized that image capture and association with downloadable content may also be made, in various embodiments, based on packaging for the physical media 120. As mentioned herein, in various embodiments, the camera 150 may be coupled or otherwise associated with a capture device 205, which may be configured to provide the captured image to other entities. In various embodiments, the camera 150 may be partially or wholly contained in the capture device 205; in other embodiments, the camera 150 may communicate with the capture device 205, such as via a wired or wireless network. In some embodiments, the capture device 205 may include the content consumption device 108. In other embodiments, the capture device 205 may include other devices, such as a smartphone or other mobile device, a laptop computer, a desktop computer, a set-top box, etc.

In various embodiments, the physical media 120 may include one or more visual aspects that facilitate the content provisioning 116 (or other entity) in uniquely identifying associated downloadable content. For example, in various embodiments, the physical media 120 may include one or more unique identifiers 280, which may be configured to provide information sufficient to uniquely identify a piece of physical media 120, or even a piece of downloadable content that is associated with the physical media. In various embodiments, the unique identifier 280 may take various forms. For example, the unique identifier 280 may including one or two-dimensional machine-readable codes, such as Universal Product Codes, QR codes, and/or other codes. In various embodiments, the unique identifier 280 may include tamper- or counterfeit-resistant measures as well, such as holographic or other visual aspects that may be difficult to spoof. In addition to the unique identifier 280, in various embodiments, the physical media 120 may also include artwork 290, such as visual art on a disc surface or on packaging. This artwork 290 may also be used, in various embodiments, by the content consumption device(s) 108 to identify downloadable content associated with the physical media 120.

In various embodiments, the physical media may optionally include a previous provisioning indicator 250 ("PPI 250"). In various embodiments, the PPI 250 may include a sticker that may be applied to the physical media 120 in association with a first provisioning of downloadable content associated with the physical media; this sticker may include anti-tampering indicators that would modify visual aspects of the physical media if the PPI 250 were later to be removed (in whole or in part). In various embodiments, one or more stickers for the PPI 250 may be included along with a sale of the physical media 120. In various embodiments, the content provisioning 116 may be configured to prevent provision of downloadable content to a content consumer if the content consumption device(s) 108 detects that the PPI 250 is present, such as by detecting the presence of the PPI 250 in a captured image of the physical media 120. In various embodiments, the PPI 250 may be required by the content provisioning 116 before provisioning of the downloadable content may be performed. In various embodiments, the presence of the PPI 250 on the physical media 120 may indicate to the content provisioning 116 (or the capture device 205) that downloadable content associated with the physical media 120 has previously been provisioned, either to the content consumer currently in possession of the physical media 120, or to another content consumer who was previously in possession of the physical media 120.

In various embodiments, the content provisioning 116 may include one or more modules that may be configured to facilitate provisioning of downloadable content to a content consumer. For example, the content provisioning 116 may include an identification module 210 which may be configured to identify downloadable content for provisioning based on an image of physical media 120 captured by the camera 150. In another example, the content provisioning 116 may include a provision module 220 which may be configured to facilitate provisioning of downloadable content, such as to the content consumption device(s) 108.

In various embodiments, the content consumption device(s) 108 may receive one or more indicators of matched content from the content provisioning 116, such as when more than one piece of downloadable content is associated with a particular piece of physical media 120. For example, the content provisioning 116 may determine, through review of records of downloadable content in a content library 230, that multiple pieces of downloadable content are available and associated with the physical media 120. In such embodiments, the content provisioning 116 may send the one or more indicators of matched content for selection by a content consumer (such as through the user interface engine 136) before provisioning downloadable content. Particular examples of the processes performed by the modules and entities illustrated in FIG. 2 are described below.

It may be recognized that, while techniques for provisioning of downloadable content are described herein with reference to the content consumption device 108, capture device 205, camera 150, and content provisioning 116, in various embodiments, other devices may perform techniques described herein. For example, personal computers, laptops, gaming devices, and mobile devices may be configured to perform one or more aspects described herein. In various embodiments, other entities, such as networked or cloud-based entities may perform one or more identification and provisioning aspects described herein in lieu of the content provisioning 116. In addition, in various embodiments, multiple devices may be utilized in concert, such as a mobile capture device 205 configured to capture an image of physical media 120 for provisioning of downloadable content to a separate device, such as content consumption device 108, or a personal computer.

Figure 3:
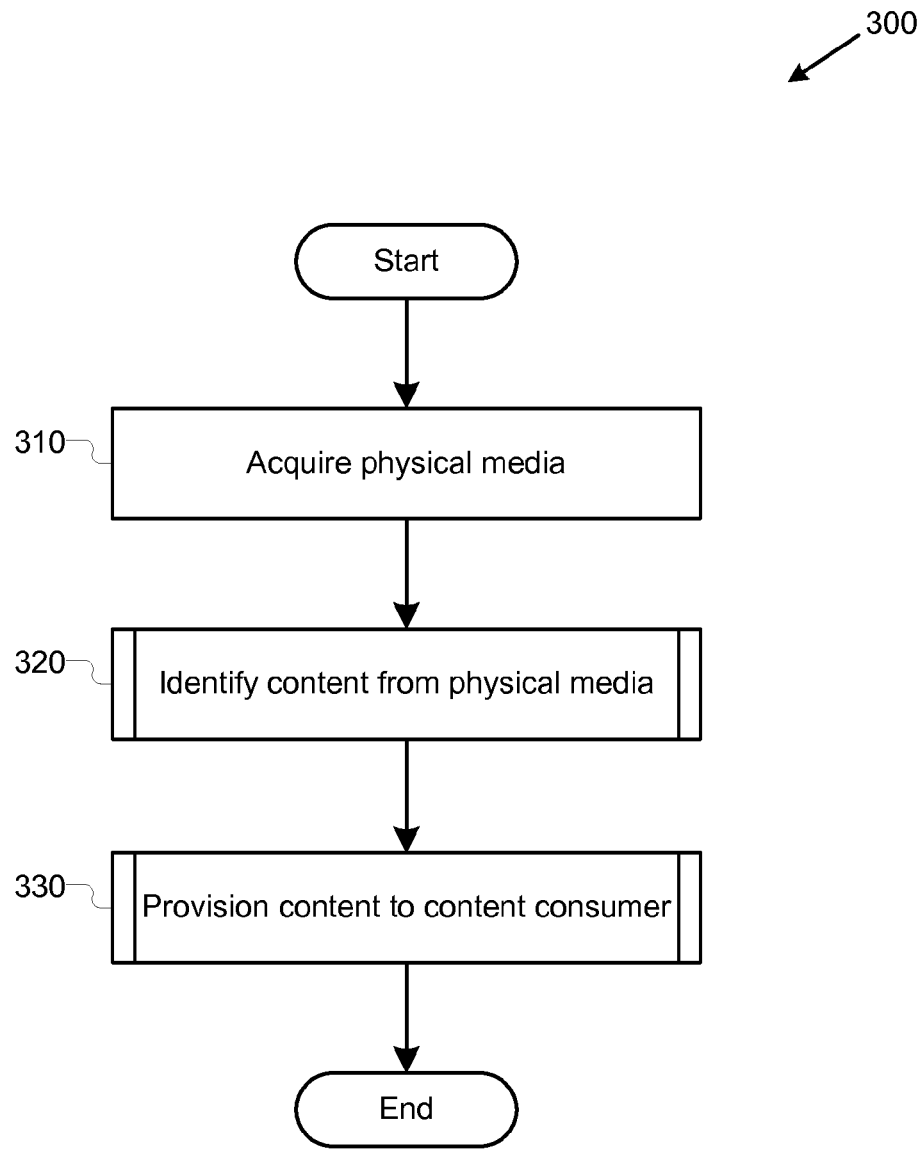
FIG. 3 illustrates an example process for provisioning of downloadable content, in accordance with various embodiments.

Referring now to FIG. 3, an example process 300 for provisioning of downloadable content is illustrated in accordance with various embodiments. While FIG. 3 illustrates particular example operations for process 300, in various embodiments, process 300 may include additional operations, omit illustrated operations, and/or combine illustrated operations. In various embodiments, process 300 may be performed by the content consumption device(s) 108 or other devices. The process may begin at operation 310, where a content consumer may acquire physical media 120 (and/or packaging for physical media 120). Next, at operation 320, the content provisioning 116 (and in particular the identification module 210) may identify downloadable content from the physical media. Various embodiments of operation 320 are described below with reference to process 400 of FIG. 4. Next, at operation 330, the content provisioning 116 (and in particular the provisioning module 220) may facilitate provisioning of downloadable content for consumption by the content consumer. Various embodiments of operation 330 are described below with reference to process 500 of FIG. 5. The process may then end.

Figure 4:
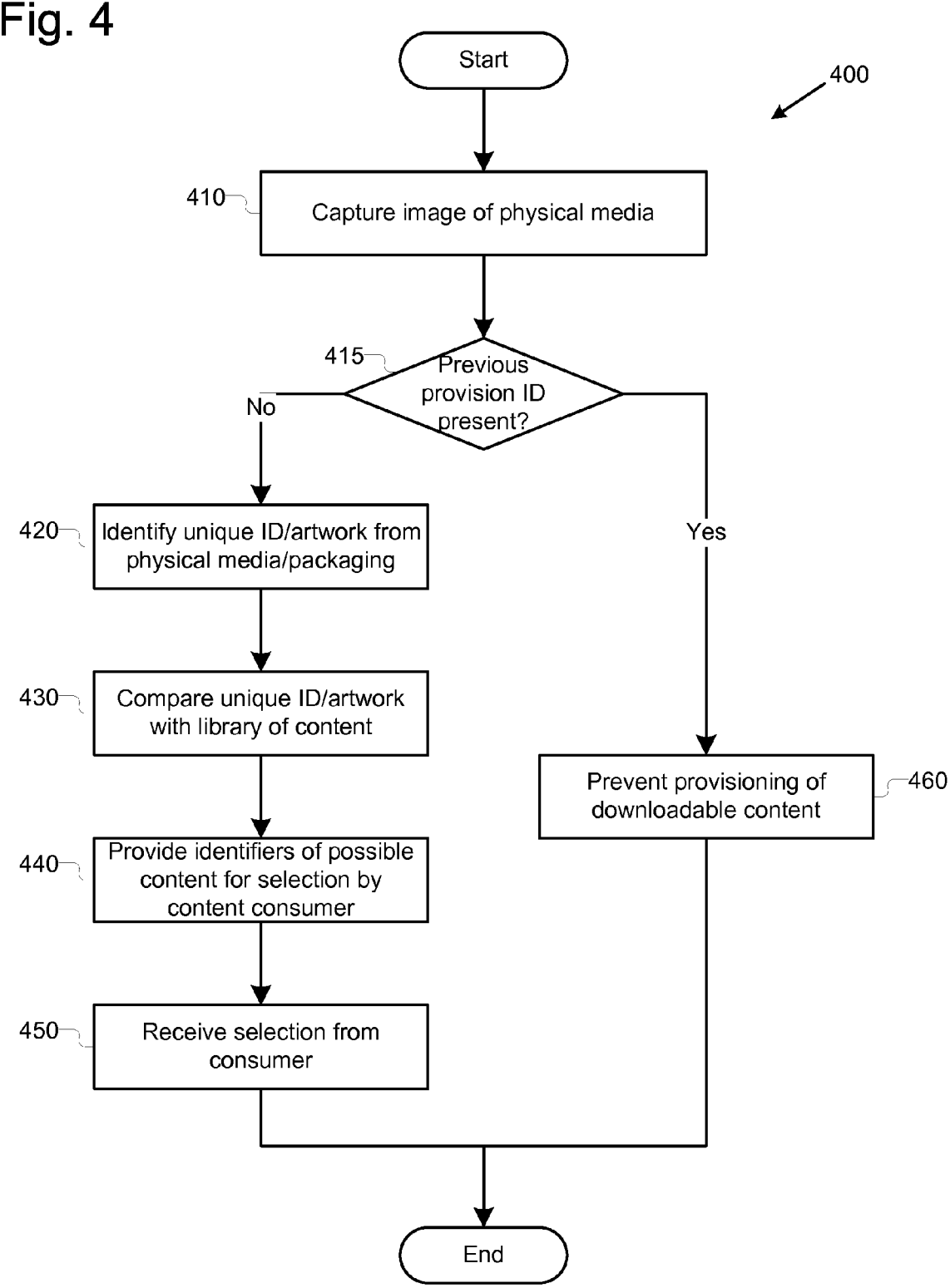
FIG. 4 illustrates an example process for identifying downloadable content from physical media, in accordance with various embodiments.

Referring now to FIG. 4, an example process 400 for identifying downloadable content from physical media is illustrated in accordance with various embodiments. While FIG. 4 illustrates particular example operations for process 400, in various embodiments, process 400 may include additional operations, omit illustrated operations, and/or combine illustrated operations. In various embodiments, parts of process 400 may be performed by the identification module 210 of the content provisioning 116. The process may begin at operation 410, where the camera 150 of the capture device 205 may capture an image of the physical media 120. Next, at decision operation 415, the identification module 210 may determine whether the PPI 250 is present. If the PPI 250 is present, then the content provisioning 116 may determine that downloadable content has previously been provisioned for the particular physical media 120, and at operation 460, the content provisioning 116 may prevent provisioning of any downloadable content. The process may then end. It may be noted that, while the illustrated process 400 includes a determination of whether a PPI 250 is present, in other embodiments, no PPI may be present and/or checked for. This may allow, in some embodiments, downloadable content to be provisioned repeatedly for a particular piece of physical media 120. In other embodiments, the determination of whether a PPI 250 is present may be made by the capture device 205 rather than by the content provisioning 116.

If no PPI 250 is present after the determination of decision operation 415, then at operation 420, the identification module 210 may identify the unique identifier 280 and/or artwork 290 on the physical media 120. In various embodiments, the identification module 210 may be configured to identify the unique identifier 280 and/or artwork 290 through various techniques, such as based on their location on the physical media 120, visual identifiers directing the locations of the unique identifier 280 and/or artwork 290, and/or other means. Next, at operation 430, the identification module 210 may compare the identified unique identifier 280 and/or artwork 290 to a library of content. In some embodiments, the identification module 210 may perform this comparison by sending a request to the content library 230. In other embodiments, the identification module 210 may identify downloadable content through other means, such as, for example, by decoding specific downloadable content information from the unique identifier 280.

Figure 5:
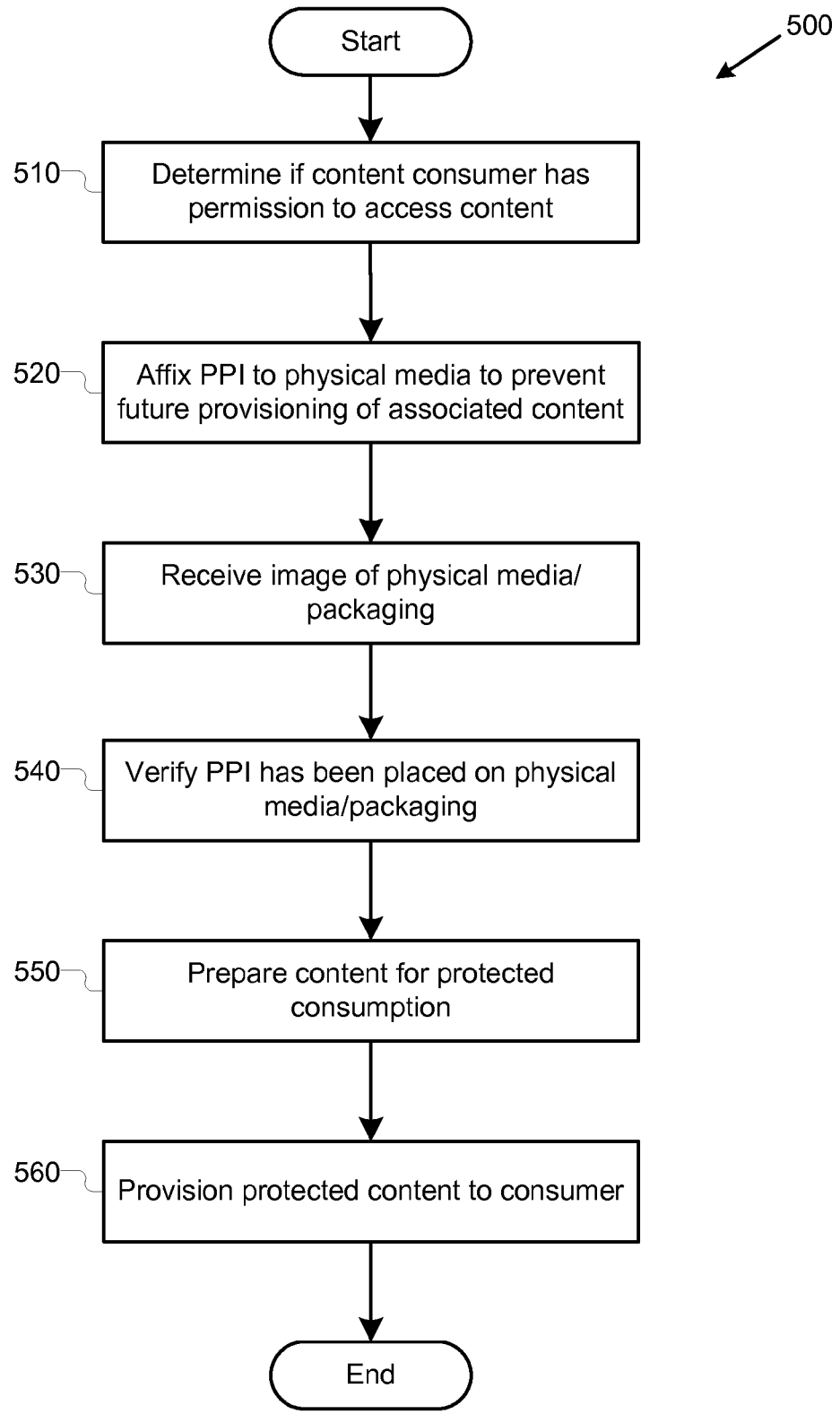
FIG. 5 illustrates an example process for provisioning downloadable content to a content consumer, in accordance with various embodiments.

Next, at operation 440, the identification module 210 may provide one or more identifiers of possible content for selection by the content consumer. For example, if, during operation 430, multiple pieces of downloadable content are identified as being associated with the physical media 120, at operation 440, the identification module may present identifiers of these pieces of downloadable content for selection by the content consumer. Such presentation may be performed, in some embodiments, through the user interface engine 136 of the contention consumption device 108. Next, at operation 450, the identification module 210 may receive a selection of an identifier of piece of downloadable content, and the process may end. In some embodiments, if only one piece of downloadable Referring now to FIG. 5, an example process 500 for provisioning downloadable content to a content consumer is illustrated in accordance with various embodiments. While FIG. 5 illustrates particular example operations for process 500, in various embodiments, process 500 may include additional operations, omit illustrated operations, and/or combine illustrated operations. In various embodiments, process 500 may be performed by the provisioning module 220 of the content provisioning 116 with reference to a specific identified piece of downloadable content. The process may begin at operation 510, where the provisioning module 220 may determine whether the content consumer has permission to access the identified downloadable content. In various embodiments, this permission may be directed based on previously acquired permissions, such as permissions based on content purchases, content subscriptions, geographical location of the content consumer (and/or content consumption device 108), age or other demographics of the content consumer, etc.

Next, at operation 520, the content consumer may modify the physical media 120 (and/or packaging) to prevent future provisioning of associated downloadable content. For example, the content consumer may be directed at operation 520 to affix a PPI 250 to the physical media 120 such that an image of the PPI 250 will be captured if an image of the physical media is captured. Next, at operation 530, the camera 150 may capture a second image of the physical media 120, and at operation 540, the provisioning module 220 may verify that the PPI 250 has been affixed to the physical media. In embodiments where the PPI 250 is not used, this operation may be omitted.

After confirming through operations 520-540 that the physical media 120 may not be used for future provisioning of downloadable content (if the PPI 250 is used), then at operation 550, the provisioning module 220 may direct the content provisioning 116 to prepare the downloadable content for protected consumption at operation 550. In various embodiments, the content provisioning 116 may encrypt or otherwise protect the downloadable content to prevent unauthorized copying or access to the downloadable content after provisioning. Next, at operation 560, the content provisioning 116 may provision the downloadable content to the content consumer, such as through network 106. The process may then end.

Figure 6:
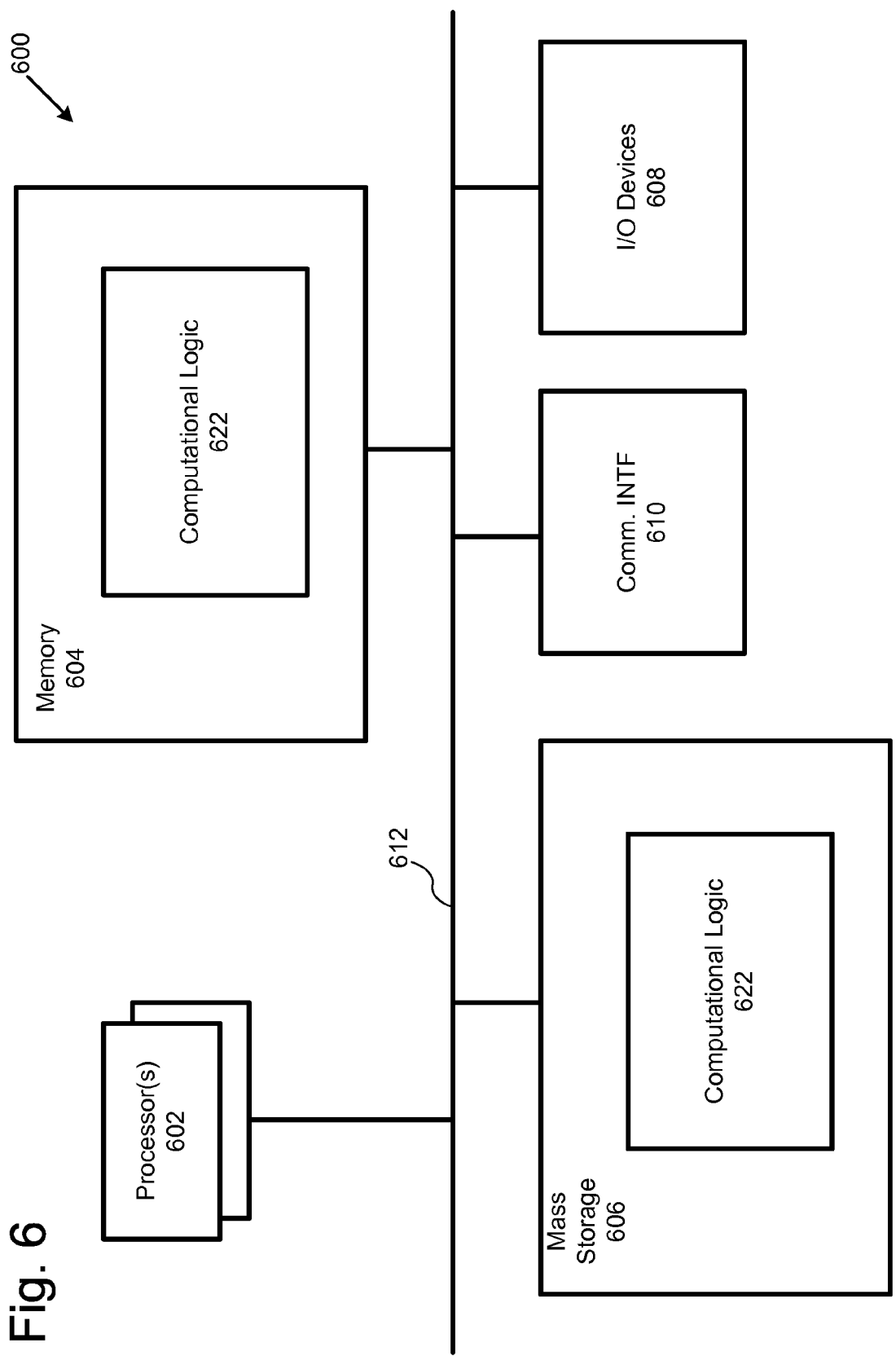
FIG. 6 illustrates an example computing environment suitable for practicing various aspects of the present disclosure, in accordance with various embodiments.

Referring now to FIG. 6, an example computer suitable for practicing various aspects of the present disclosure, including processes of FIGS. 3-5, is illustrated in accordance with various embodiments. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control, remote control, gaming controller, image capture device, and so forth) and communication interfaces 610 (such as network interface cards, modems, infrared receivers, radio receivers (e.g., Bluetooth), and so forth). The elements may be coupled to each other via system bus 612, which may represent one or more buses. In the case of multiple buses, they may be bridged by one or more bus bridges (not shown). In various embodiments, computer 600 may include various form factors and/or devices, including mobile devices, laptops, desktops, set-top boxes, gaming devices, etc.

Each of these elements may perform its conventional functions known in the art. In particular, system memory 604 and mass storage devices 606 may be employed to store a working copy and a permanent copy of the programming instructions implementing the operations associated with content consumption device(s) 108, e.g., operations associated with downloadable content provisioning techniques shown in FIGS. 3-5. The various elements may be implemented by assembler instructions supported by processor(s) 602 or high-level languages, such as, for example, C, that can be compiled into such instructions.

A permanent copy of the programming instructions may be placed into permanent storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The number, capability and/or capacity of these elements 610-612 may vary, depending on whether computer 600 is used as a content aggregator/distributor server 104 or a content consumption device 108 (e.g., a player 122). Their constitutions are otherwise known, and accordingly will not be further described.

Figure 7:
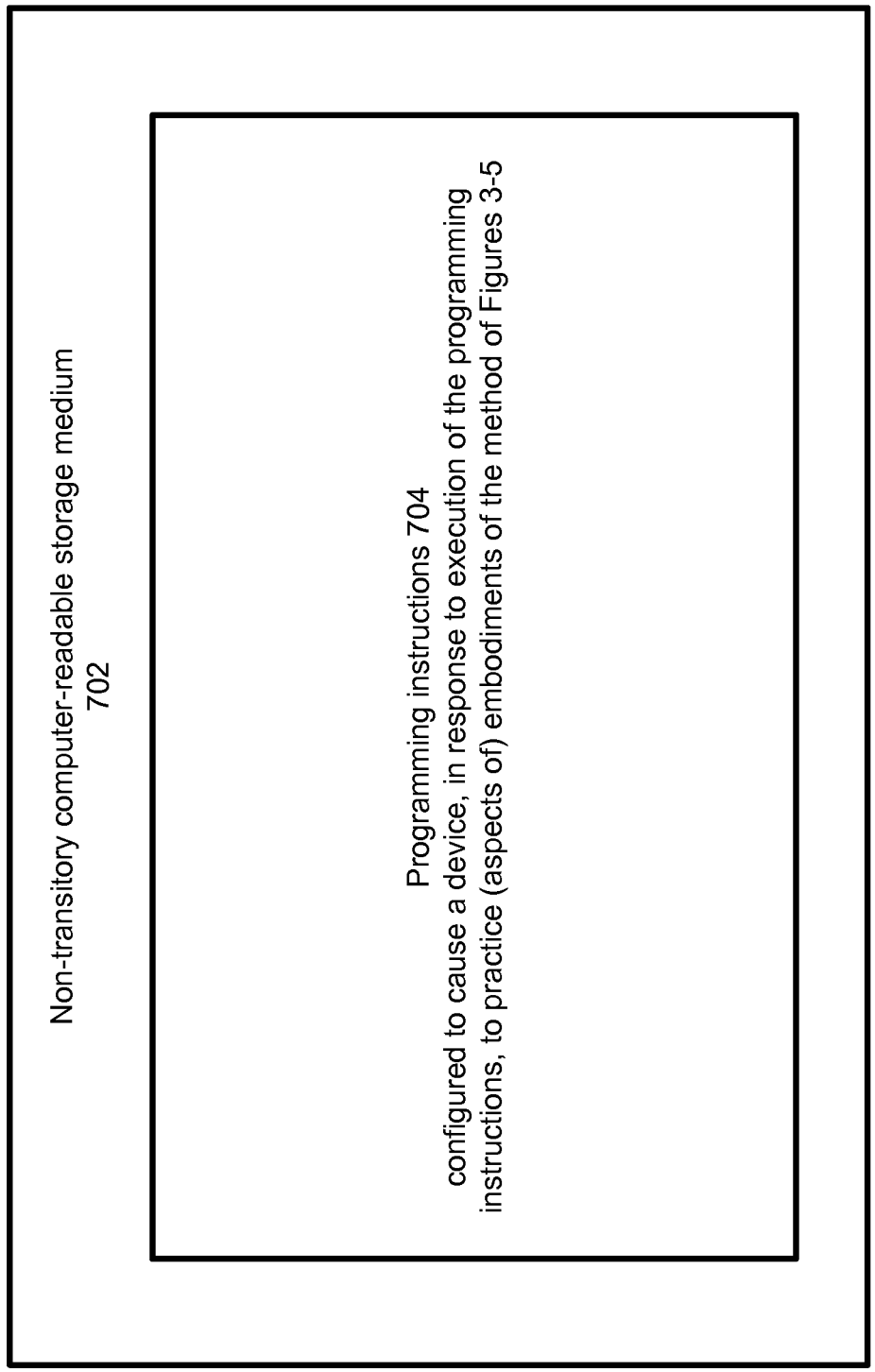
FIG. 7 illustrates an example storage medium with instructions configured to enable an apparatus to practice various aspects of the present disclosure, in accordance with various embodiments.

FIG. 7 illustrates an example least one computer-readable storage medium 702 having instructions configured to practice all or selected ones of the operations associated with content aggregator/distributor servers 104, in particular, video frame alignment module 118, earlier described, in accordance with various embodiments. As illustrated, least one computer-readable storage medium 702 may include a number of programming instructions 704. Programming instructions 704 may be configured to enable a device, e.g., computer 600, in response to execution of the programming instructions, to perform, e.g., various operations of processes of FIGS. 3-5, e.g., but not limited to, to the various operations performed to perform provisioning of downloadable content. In alternate embodiments, programming instructions 704 may be disposed on multiple computer-readable storage media 702 instead.

Referring back to FIG. 6, for one embodiment, at least one of processors 602 may be packaged together with computational logic 622 configured to practice aspects of processes of FIGS. 3-5. For one embodiment, at least one of processors 602 may be packaged together with computational logic 622 configured to practice aspects of processes of FIGS. 3-5 to form a System in Package (SiP). For one embodiment, at least one of processors 602 may be integrated on the same die with computational logic 622 configured to practice aspects of processes of FIGS. 3-5. For one embodiment, at least one of processors 602 may be packaged together with computational logic 622 configured to practice aspects of processes of FIGS. 3-5 to form a System on Chip (SoC). For at least one embodiment, the SoC may be utilized in, e.g., but not limited to, a computing tablet.

Various embodiments of the present disclosure have been described. These embodiments include, but are not limited to, those described in the following paragraphs.

Example 1 may include one or more computer-readable storage media comprising a plurality of instructions configured to cause a computing device, in response to execution of the instructions by the computing device, to provision downloadable content associated with physical media. The instructions may cause the computing device to identify downloadable content associated with the piece of physical media based at least in part on an image taken from a piece of physical media under control of a content consumer, determine that provision of the downloadable content to the content consumer is authorized, and facilitate provision of the downloadable content to the content consumer.

Example 2 may include the computer-readable media of Example 1, wherein identify downloadable content may include identify an image of a unique identifier and/or artwork in the image.

Example 3 may include the computer-readable media of Example 2, wherein identify downloadable content further may include compare the image of the unique identifier and/or the artwork against a library of downloadable content.

Example 4 may include the computer-readable media of Example 1, wherein identify downloadable content may include provide one or more selections of possible downloadable content to the content consumer and receive an selection of a selected downloadable content as the identified downloadable content.

Example 5 may include the computer-readable media of any of Examples 1-4, wherein determine that provision of the downloadable content to the content consumer is authorized may include determine whether downloadable content has previously been provisioned.

Example 6 may include the computer-readable media of Example 5, wherein determine whether downloadable content has been previously provisioned may include determine whether downloadable content has been previously provided to the content consumer and, in response to a determination that downloadable content has been provided to the content consumer, prevent further provision of the downloadable content to the content consumer.

Example 7 may include the computer-readable media of Example 5, wherein determine whether downloadable content has been previously provisioned may include determine whether downloadable content has been previously provided to an other content consumer and, in response to a determination that downloadable content has been provided to the other content consumer, prevent further provision of the downloadable content to the content consumer.

Example 8 may include the computer-readable media of Example 5, wherein determine whether downloadable content has been previously provisioned may include determine whether the image contains an image of a previous provisioning indicator.

Example 9 may include the computer-readable media of Example 8, wherein the previous provisioning indicator is a sticker.

Example 10 may include the computer-readable media of Example 8, wherein facilitate provision of the downloadable content may include receive a second image taken from the piece of physical media and determine whether the second image contains an image of the previous provisioning indicator before provision of the downloadable content.

Example 11 may include the computer-readable media of any of Examples 1-4, wherein determine that provision of the downloadable content to the content consumer is authorized may include determine whether the content consumer has permissions to be provisioned the downloadable content.

Example 12 may include the computer-readable media of Example 1, wherein the image taken from a piece of physical media may include an image of a videodisc or a compact disc.

Example 13 may include the computer-readable media of Example 1, wherein the image taken from a piece of physical media may include an image of media packaging.

Example 14 may include an apparatus configured to provision content associated with physical media. The apparatus may include one or more computing processors. The apparatus may also include an identification module configured to operate on the one or more computing processors to identify downloadable content associated with the piece of physical media based at least in part on an image taken from a piece of physical media under control of a content consumer. The apparatus may also include a provisioning module configured to operate on the one or more computing processors to determine that provision of the downloadable content to the content consumer is authorized and facilitate provision of the downloadable content to the content consumer.

Example 15 may include the apparatus of Example 14, wherein identify downloadable content may include identify an image of a unique identifier and/or artwork in the image.

Example 16 may include the apparatus of Example 15, wherein identify downloadable content further may include compare the image of the unique identifier and/or the artwork against a library of downloadable content.

Example 17 may include the apparatus of Example 14, wherein identify downloadable content may include provide one or more selections of possible downloadable content to the content consumer and receive an selection of a selected downloadable content as the identified downloadable content.

Example 18 may include the apparatus of any of Examples 14-16, wherein the identification module may be further configured to determine whether downloadable content has previously been provisioned.

Example 19 may include the apparatus of Example 18, wherein determine whether downloadable content has been previously provisioned may include determine whether downloadable content has been previously provided to the content consumer and, in response to a determination that downloadable content has been provided to the content consumer, prevent further provision of the downloadable content to the content consumer.

Example 20 may include the apparatus of Example 18, wherein determine whether downloadable content has been previously provisioned may include determine whether downloadable content has been previously provided to an other content consumer and, in response to a determination that downloadable content has been provided to the other content consumer, prevent further provision of the downloadable content to the content consumer.

Example 21 may include the apparatus of Example 18, wherein determine whether downloadable content has been previously provisioned may include determine whether the image contains an image of a previous provisioning indicator.

Example 22 may include the apparatus of Example 21, wherein the previous provisioning indicator is a sticker.

Example 23 may include the apparatus of Example 21, wherein facilitate provision of the downloadable content may include receive a second image taken from the piece of physical media and determine whether the second image contains an image of the previous provisioning indicator before provision of the downloadable content.

Example 24 may include the apparatus of any of Examples 14-16, wherein determine that provision of the downloadable content to the content consumer is authorized may include determine whether the content consumer has permissions to be provisioned the downloadable content.

Example 25 may include the apparatus of any of Examples 14-16, wherein the image taken from a piece of physical media may include an image of a videodisc or a compact disc.

Example 26 may include the apparatus of any of Examples 14-16, wherein the image taken from a piece of physical media may include an image of media packaging.

Example 27 may include a computer-implemented method for provisioning content associated with physical media. The method may include identifying, by the computing device, downloadable content associated with the piece of physical media based at least in part on an image taken from a piece of physical media under control of a content consumer. The method may also include determining, by the computing device, that provision of the downloadable content to the content consumer is authorized and facilitating, by the computing device, provision of the downloadable content to the content consumer.

Example 28 may include the method of Example 27, wherein identifying downloadable content may include identifying an image of a unique identifier and/or artwork in the image.

Example 29 may include the method of Example 28, wherein identify downloadable content further may include comparing the image of the unique identifier and/or the artwork against a library of downloadable content.

Example 30 may include the method of Example 27, wherein identifying downloadable content may include providing one or more selections of possible downloadable content to the content consumer and receiving an selection of a selected downloadable content as the identified downloadable content.

Example 31 may include the method of any of Examples 27-30, wherein determining that provision of the downloadable content to the content consumer is authorized may include determining whether downloadable content has previously been provisioned.

Example 32 may include the method of Example 31, wherein determining whether downloadable content has been previously provisioned may include determining whether downloadable content has been previously provided to the content consumer and, in response to a determination that downloadable content has been provided to the content consumer, preventing further provision of the downloadable content to the content consumer.

Example 33 may include the method of Example 31, wherein determining whether downloadable content has been previously provisioned may include determining whether downloadable content has been previously provided to an other content consumer and, in response to a determination that downloadable content has been provided to the other content consumer, preventing further provision of the downloadable content to the content consumer.

Example 34 may include the method of Example 31, wherein determining whether downloadable content has been previously provisioned may include determining whether the image contains an image of a previous provisioning indicator.

Example 35 may include the method of Example 34, wherein the previous provisioning indicator is a sticker.

Example 36 may include the method of Example 34, wherein facilitating provision of the downloadable content may include receiving a second image taken from the piece of physical media; and determining whether the second image contains an image of the previous provisioning indicator before provision of the downloadable content.

Example 37 may include the method of any of Examples 27-30, wherein determining that provision of the downloadable content to the content consumer is authorized may include determining whether the content consumer has permissions to be provisioned the downloadable content.

Example 38 may include the method of any of Examples 27-30, wherein the image taken from a piece of physical media may include an image of a videodisc or a compact disc.

Example 39 may include the method of any of Examples 27-30, wherein the image taken from a piece of physical media may include an image of media packaging.

Example 40 may include an apparatus for provisioning content associated with physical media. The apparatus may include means for identifying downloadable content associated with the piece of physical media based at least in part on an image taken from a piece of physical media under control of a content consumer. The apparatus may also include means for determining that provision of the downloadable content to the content consumer is authorized and means for facilitating provision of the downloadable content to the content consumer.

Example 41 may include the apparatus of Example 40, wherein means for identifying downloadable content may include means for identifying an image of a unique identifier and/or artwork in the image.

Example 42 may include the apparatus of Example 41, wherein means for identify downloadable content further may include means for comparing the image of the unique identifier and/or the artwork against a library of downloadable content.

Example 43 may include the apparatus of Example 40, wherein means for identifying downloadable content may include means for providing one or more selections of possible downloadable content to the content consumer and means for receiving an selection of a selected downloadable content as the identified downloadable content.

Example 44 may include the apparatus of any of Examples 40-43, wherein means for determining that provision of the downloadable content to the content consumer is authorized may include means for determining whether downloadable content has previously been provisioned.

Example 45 may include the apparatus of Example 44, wherein means for determining whether downloadable content has been previously provisioned may include means for determining whether downloadable content has been previously provided to the content consumer and means for, in response to a determination that downloadable content has been provided to the content consumer, preventing further provision of the downloadable content to the content consumer.

Example 46 may include the apparatus of Example 44, wherein means for determining whether downloadable content has been previously provisioned may include means for determining whether downloadable content has been previously provided to an other content consumer and means for, in response to a determination that downloadable content has been provided to the other content consumer, preventing further provision of the downloadable content to the content consumer.

Example 47 may include the apparatus of Example 44, wherein means for determining whether downloadable content has been previously provisioned may include means for determining whether the image contains an image of a previous provisioning indicator.

Example 48 may include the apparatus of Example 47, wherein the previous provisioning indicator is a sticker.

Example 49 may include the apparatus of Example 47, wherein means for facilitating provision of the downloadable content may include means for receiving a second image taken from the piece of physical media and means for determining whether the second image contains an image of the previous provisioning indicator before provision of the downloadable content.

Example 50 may include the apparatus of any of Examples 40-43, wherein means for determining that provision of the downloadable content to the content consumer is authorized may include means for determining whether the content consumer has permissions to be provisioned the downloadable content.

Example 51 may include the apparatus of any of Examples 40-43, wherein the image taken from a piece of physical media may include an image of a videodisc or a compact disc.

Example 52 may include the apparatus of any of Examples 40-43, wherein the image taken from a piece of physical media may include an image of media packaging.

Computer-readable media (including least one computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus comprising:
a memory configured to store downloadable content; and
one or more computing processors configured to execute one or more instructions to:
   receive, from a content consumer, a first image regarding a piece of physical media associated with the content consumer;
   identify, based on the first image, a portion of the downloadable content associated with the piece of physical media;
   determine, based on the first image, whether the content consumer is authorized to access the portion of the downloadable content, wherein the processor, when determining whether the content consumer is authorized to access the portion of the downloadable content is further configured to:
      determine whether the first image includes a representation of a provisioning indicator (PI),
      determine that the content consumer is not authorized to access the portion of the downloadable content when the first image includes the representation of the PI,
      forward, when the first image does not include the representation of the PI, a message to the content consumer, wherein the message directs the content consumer to affix the PI to the piece of physical media,
      receive, after forwarding the message and from the content consumer, a second image regarding the piece of physical media,
      determine whether the second image includes the representation of the PI, and
      determine that the content consumer is authorized to access the portion of the downloadable content when the second image includes the representation of the PI; and
   provision the portion of the downloadable content to the content consumer based on determining that the content consumer is authorized to access the portion of the downloadable content.

2. The apparatus of claim 1, wherein the processor, when provisioning the portion of the downloadable content to the content consumer, is further configured to:
encode the portion of the downloadable content for use by a player associated with the content consumer.

3. The apparatus of claim 2, wherein the processor, encoding the portion of the downloadable content for use by the content consumer, is further configured to:
encode the portion of the downloadable content based on a Moving Picture Experts Group (MPEG) standard.

4. The apparatus of claim 3, wherein the MPEG standard includes a H.264 standard or an MPEG Audio Layer III (MP3) standard.

5. The apparatus of claim 3, wherein the processor, when provisioning the portion of the downloadable content to the content consumer, is further configured to:
encode the portion of the downloadable content in a real-time streaming protocol (RTSP).

6. The apparatus of claim 1, wherein the processor, when identifying the portion of the downloadable content associated with the piece of physical media, is further configured to:
identify a unique identifier in the first image; and
identify the piece of the physical media based on the unique identifier included in the first image.

7. The apparatus of claim 6, wherein the unique identifier includes a universal product code (UPC) or a quick response (QR) code.

8. The apparatus of claim 6, wherein the unique identifier includes a holographic image.

9. The apparatus of claim 1, wherein the processor, when identifying the portion of the downloadable content associated with the piece of physical media, is further configured to:
compare the first image to images associated with a plurality of physical media; and
identify, based on comparing the first image to the images associated with the plurality of physical media, a particular one of the plurality of physical media corresponding to the piece of physical media.

10. The apparatus of claim 9, wherein the processor, when identifying the portion of the downloadable content associated with the piece of physical media, is further configured to:
select the portion of the downloadable content associated with the piece of physical media based on the particular one of the plurality of physical media.

11. The apparatus of claim 1, wherein the processor, when determining whether the content consumer is authorized to access the portion of the downloadable content is further configured to:
determine whether the content consumer has a permission to access the portion of the downloadable content; and
determine that the content consumer is not authorized to access the portion of the downloadable content when the content consumer does not have the permission to access the portion of the downloadable content.

12. The apparatus of claim 11, wherein the processor, when determining whether the content consumer has the permission to access the portion of the downloadable content, is further configured to:
identify permissions associated with the content consumer based on at least one of purchases by the content consumer, a geographical location associated with the content consumer, or a demographic attributed of the content consumer; and
determine whether the permissions associated with the content consumer enable the content consumer to access the portion of the downloadable content.

13. The apparatus of claim 1, wherein the processor, when identifying the portion of the downloadable content associated with the piece of physical media, is further configured to:
identify artwork included in the first image; and
identify the piece of the physical media based on the artwork included in the first image.

14. The apparatus of claim 1, wherein the processor, when determining whether the content consumer is authorized to access the portion of the downloadable content is further configured to:
  determine whether the portion of the downloadable content has been provided to the content consumer; and
  determine that the content consumer is not authorized to access the portion of the downloadable content based on determining that the portion of the downloadable content has been provided to the content consumer.

15. The apparatus of claim 1, wherein the processor, when determining whether the content consumer is authorized to access the portion of the downloadable content is further configured to:
  determine whether the portion of the downloadable content has been provided to another consumer who differs from the content consumer; and
  determine that the content consumer is not authorized to access the portion of the downloadable content based on determining that the portion of the downloadable content has been provided to the other consumer.

16. The apparatus of claim 1, wherein the apparatus comprises a device associated with the content consumer.

17. The apparatus of claim 1, further comprising a camera configured to capture at least one of the first image or the second image.

18. The apparatus of claim 1, wherein the physical media comprises at least one of:
  a video disc
  a compact disc, or
  media packaging associated with the video disc or the compact disc.

19. The apparatus of claim 1, wherein the portion of the downloadable content corresponds to content stored on the piece of physical media.

20. The apparatus of claim 1, wherein the portion of the downloadable content includes at least one of video data, image data, audio data, or text data.

21. The apparatus of claim 1, wherein the processor, when provisioning the portion of the downloadable content to the content consumer, is further configured to:
  cause the portion of the downloadable content to be streamed to the content consumer.

22. The apparatus of claim 1, wherein the processor, when provisioning the portion of the downloadable content to the content consumer, is further configured to:
  perform frame alignment on video frames included in the portion of the downloadable content.

23. The apparatus of claim 1, wherein the processor, when identifying the portion of the downloadable content associated with the piece of physical media, is further configured to:
  present a menu identifying portions of the downloadable content that are available to the content consumer; and
  receive, from the content consumer, an input identifying, as the portion of the downloadable content associated with the piece of physical media, one of the portions of the downloadable content.

24. The apparatus of claim 1, wherein the PI includes a sticker configured to be applied to the piece of physical media.

25. The apparatus of claim 1, wherein the processor, when provisioning the portion of the downloadable content to the content consumer, is further configured to:
  encrypt the portion of the downloadable content.

* * * * *